(12) United States Patent
Siecke et al.

(10) Patent No.: US 9,264,626 B2
(45) Date of Patent: Feb. 16, 2016

(54) METHOD AND DEVICE FOR RECOGNISING PULSING LIGHT SOURCES

(71) Applicant: Hella KGaA Hueck & Co., Lippstadt (DE)

(72) Inventors: Jona Siecke, Berlin (DE); Ingo Hoffmann, Berlin (DE); Andreas Debski, Berlin (DE); Marko Stefanovic, Berlin (DE); Tara Lorenz, Berlin (DE); Marcel Mohr, Berlin (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 555 days.

(21) Appl. No.: 13/768,443

(22) Filed: Feb. 15, 2013

(65) Prior Publication Data

US 2013/0229521 A1 Sep. 5, 2013

Related U.S. Application Data

(63) Continuation-in-part of application No. 13/811,520, filed as application No. PCT/EP2011/003711 on Jul. 18, 2011, now abandoned.

(30) Foreign Application Priority Data

Jul. 19, 2010 (DE) .......................... 10 2010 027 625

(51) Int. Cl.
    *G06K 9/00* (2006.01)
    *H04N 5/235* (2006.01)

(52) U.S. Cl.
    CPC .................................... *H04N 5/2351* (2013.01)

(58) Field of Classification Search
    None
    See application file for complete search history.

(56) References Cited

U.S. PATENT DOCUMENTS

| | | | | |
|---|---|---|---|---|
| 2003/0230705 | A1* | 12/2003 | Stephan | B60Q 1/1423 250/214 VT |
| 2004/0031922 | A1* | 2/2004 | Stephan | B60Q 1/14 250/330 |
| 2005/0094410 | A1* | 5/2005 | Stephan | G01S 17/107 362/510 |
| 2005/0168151 | A1* | 8/2005 | Shaffer | B60R 1/00 315/82 |
| 2007/0221822 | A1* | 9/2007 | Stein | B60Q 1/143 250/205 |
| 2011/0310249 | A1* | 12/2011 | Lambert | H04N 5/235 348/148 |

OTHER PUBLICATIONS

Arai et al. Experimental on Hierarchical Transmission Scheme for Visible Light Communication using LED Traffic Light and High-Speed Camera, 2007, Vehicular Technology Conference VTC-2007, 2174-2178.*

(Continued)

*Primary Examiner* — Matthew Bella
*Assistant Examiner* — Jason Heidemann
(74) *Attorney, Agent, or Firm* — Jacobson Holman, PLLC.

(57) ABSTRACT

The invention relates to a method and a device for recognizing a pulsing light source, in which a sequence of individual images is acquired with a light sensitive sensor. In an evaluation unit, all or at least some of the picture points of each individual image are examined with regard to at least one predefined feature. A gray value of any picture point depends on two or more charge levels of at least one of the photodetectors of the sensor corresponding to the picture point at the ends of at least two integration intervals for the picture point. The at least two integration intervals for said picture point have different lengths. The examination comprises an examination of the picture points as to whether the picture points have gray values in a defined vicinity of one of at least one predefined gray value.

25 Claims, 5 Drawing Sheets

(56) References Cited

OTHER PUBLICATIONS

Fish, Alexander, and Orly Yadid-Pecht. "Active Pixel Sensor Design." *CMOS Imagers: From Phototransduction to Image Processing*. Ed. Orly Yadid-Pecht, Ed.Ralph Etienne-Cummings. Boston: Kluewer Academic Publishers, 2004. 99-139.

German Federal Ministry of Justice. "Handbuch der Rechsförmlichkeit, dritte Auflage." Bundesministerium der Justiz. Jan. 1, 2008. Web Oct. 25, 2012. <http://hdr.bmj.de/page_b.1.html>.

Maurer, Markus and Christoph Stiller. *Fahrerassistenzsysteme mit maschineller Wahrnehmung*. Berlin: Springer, 2005. 8-11, 18-20.

Ohta, Jun. "4.4 Wide Dynamic Range." *Smart CMOS Image Sensors and Applications*. Boca Raton: Taylor & Francis Group, LLC, 2008. 100-108.

Ohta, Jun. "4.5 Demodulation." *Smart CMOS Image Sensors and Applications*. Boca Raton: Taylor & Francis Group, LLC, 2008. 108-115.

Ohta, Jun. "Chapter 18 Camera-Based Automotive Systems." *Smart CMOS Image Sensors and Applications*. Boca Raton: Taylor & Francis Group, LLC, 2008. 319-338.

O'Malley, Ronan, Edward Jones, and Martin Glavin. "Rear-Lamp Vehicle Detection and Tracking in Low-Exposure Color Video for Night Conditions." *IEEE Transactions on Intelligent Transportation Systems*. 11.2 (2010): 453-462.

Sodini, Charles G., and Steven J. Decker. *A 256x256 CMOS Brightness Adaptive Imaging Array with Column-Parallel Digital Output*. 1998 IEEE International Conference on Intelligent Vehicles, Oct. 28-30, 1998, Stuttgart, Germany. 347-352.

Winner, Hermann, Stephan Hakuli, and Gabriele Wolf. "3-D Imaging." *Handbuch Fahrerassistenzsysteme*. Wiesbaden: Vieweg and Teubner, 2009. 187-197.

Winner, Hermann, Stephan Hakuli, and Gabriele Wolf. "30.4 Nachtsichtsysteme" *Handbuch Fahrerassistenzsysteme*. Wiesbaden: Vieweg and Teubner, 2009. 465-468.

* cited by examiner

METHOD AND DEVICE FOR RECOGNISING PULSING LIGHT SOURCES

The invention relates to a method and to a device for recognising pulsing light sources.

Methods and devices for recognising light sources are known from various fields of technology. For example, a multitude of different methods from vehicle technology for recognising, classifying and tracing vehicle lights are described in the document DE 10 2008 025 457 A1. These can be combined with driver assistance systems, for example for the control of a lighting system or a braking system of a vehicle, in dependence on a recognised traffic situation.

It is known, for recognising light sources, in particular light sources on vehicles, for a sequence of individual images to be acquired with a camera, and for gray values of picture points of the individual images to be measured with a light-sensitive sensor of the camera. The term gray value of a picture point, as used in the present context, refers generally to a quantity which is a measure of the intensity of at least of a fraction of the light incident on the sensor. In general, a light-sensitive sensor is sensitive only to a certain fraction of the electromagnetic spectrum (comprising infrared, visible light, ultraviolet, etc.). Typically, the gray value is considered as a measure of the intensity of that fraction of light to which the sensor is sensitive. However, it is also possible that the gray value is defined such that it is a measure of the intensity of only a part of that fraction of light to which the sensor is sensitive. To detect a light source, the sensor must be sufficiently sensitive to the light emitted by the light source and the gray value is defined such that it is a measure of the intensity of a fraction the electromagnetic spectrum which comprises the light emitted by the light source. In an evaluation unit, usually at least a part of the picture points of each individual image on account of their gray values is combined or grouped together into coherent image regions of uniform gray values. These image regions are subsequently examined with regard to one or more predefined features such as for example an absolute or relative brightness, the shape or position of each such image region within the individual image. As described in DE 10 2008 025 457 A1, one can also envisage tracking such an image region over several consecutive individual images and for example examining a temporal change of the gray values of this image region, or a movement of the image region, as predefined features.

A given image region which is defined accordingly and has predefined features is finally classified as a light source.

However, it has been found to be extremely difficult, to recognise, track and classify pulsing light sources with such a method. Pulsing light sources such as a LED headlights on vehicles for example and which are operated with a pulse operation, cannot be represented as a clear, well defined image with the sensor of the camera in this manner, but only as differently shaped, non-coherent patterns which change and pulsate over time. This is particularly the case if a pulse frequency (repetition rate) is roughly as large as or larger than the read-out rate of the sensor. Repetition rates of between 50 Hz to 1000 Hz are particularly problematic. Often only very instable image regions in the individual images acquired by the camera arise due to such light sources, and these image regions are very difficult to recognise, track and classify.

This is particularly problematic due to the fact that modem vehicles to an increasing extent are designed with LED headlights (front headlight, rear lights, brake lights, indicators). Often, the repetition rates of the LEDs of these headlights are envisaged to change, for example to dim a headlight, for reducing the energy consumption, or for changing between two different operating modes of such a headlight (brake light mode and dimming mode of an LED rear light). One can also envisage for this purpose, a duty cycle of the LED or of the LEDS of a headlight being changed instead of the repetition rate (impulse rate) or additionally to the repetition rate, by way of impulse duration of the LED or LEDs also being adapted.

Many camera-based driver assistance systems are however often based on recognition of other vehicles by way of the recognition of their headlights, rear lights, and brake lights. A secure functioning of such driver assistance systems thus assumes a reliable recognition of LED headlights of vehicles.

Accordingly, it is the object of the present invention, to suggest a method as well as a device which overcome or at least mitigate the disadvantages of the state of the art. The method and the device are thus to permit pulsing light sources, such as LED headlights operated in pulse operation, to be recognised with a higher reliability and higher accuracy. Moreover, a vehicle with a driver assistance system is to be suggested, which can also recognise pulsing light sources, such as an LED headlight operated with a pulse operation, with a higher reliability and a higher accuracy.

According to the invention, this object is achieved by a method as well as a system according to the independent claims. Further developments and special embodiments are to be deduced from the dependent claims given and from the examples and the embodiments described below. Moreover, the object is also achieved by a vehicle according to claim 25.

Accordingly, with regard to the method according to the invention, one envisages a sequence of individual images being acquired with a camera and gray values of picture points of the individual images being measured with a light-sensitive sensor of the camera. The sensor comprises an array of photodetectors. These gray values are transmitted to an evaluation unit. In the evaluation unit, all or at least a part of the picture points of each individual image may be combined, on account of their gray values, into image regions. These image regions may be defined as coherent image regions. Furthermore, the image regions may be defined as image regions of uniform gray values.

Subsequently, all or some of the picture points and/or, if previously formed in the evaluation unit, all or some of said image regions are examined in the evaluation unit with regard to one or more predefined features. A given picture point or image region is classified as a (pulsing) light source or as part of a (pulsing) light source depending on whether it displays one, some or all of these features. For example, it may be envisaged that said picture point or region is classified as a (pulsing) light source or as part of a (pulsing) light source only if it displays some, one or all these features. The features proposed herein may be examined in addition to features already known in the art in order to increase the accuracy and reliability of recognizing pulsing light sources and/or to classify the type of the light source. Furthermore, it may be envisaged that one, some or all of said features are considered necessary for a picture point or region to be classified as a (pulsing) light source, or as a part of a (pulsing) light source and/or for classifying the light source as a specific type of light source; one, some or all of said features may be considered sufficient for a picture point or a region to be classified as a (pulsing) light source or as part of a (pulsing) light source and/or for classifying the light source as a specific type of light source. It is also possible that one, some or all of said features are considered as an indicator or evidence that a picture point or region corresponds to a (pulsing) light source or to a part of a (pulsing) light source and/or for classifying the light source as a specific type of light source. As indicated by the insertion of "(pulsing)" in the sentences above (and also further below), the light source may be classified as a light source, with or without further classifying it as pulsing or not pulsing. In particular one, some or all of the said features may be used to classify the kind of the light source or to derive or adopt further attributes for a classification. For example, a classification may be used for a driver assistance system proposed and described further below, for example with the driver assistance system shown in FIG. 1. In such a system it is in particular important to distinguish headlights and rear lights from other light sources. This may be done for example concerning an absolute or relative brightness, the shape or position of each such image region within the individual image followed by a tracking algorithm. These attributes are as described distorted for pulsing light sources, so that a classification may often fail. With the use of one, some or all of the proposed features as further classification features or with a correction of attributes like brightness, shape, position or tracking, a correct classification of the a light source as headlights/rear lights or as lights from other light sources is possible.

Some of the features may be defined, as some of the examples given below, on the level of regions of picture points and may be not applicable on the level of individual picture points.

It may be envisaged that said regions are formed only of those picture points which display one, some or all of the predefined features, such as any of the predefined features discussed below. It may further be envisaged, that these regions are then examined in the evaluation unit with regard to one or more (further) predefined features.

The gray values of the picture points of the individual images are measured by means of said photodetectors of the sensor. There may by a one-to-one correspondence between the picture points and the photodetectors or a one-to-many correspondence between the picture points and the photodetectors. In the first case, the gray value of any one of the picture points is determined from charge levels (which described below) of exactly one of the photodetectors. In the second case, the gray value of any one of the picture points is determined from charge levels of several of the photodetectors. The many-to-one correspondence may be accomplished be means of a micro-lens system, as generally known in the art as split-pixel design.

In order to measure the gray value of any of the picture points of any of the individual images, the one or more photodetectors corresponding to the picture point is illuminated during at least two (i.e. two or more) integration (time) intervals of that picture point of that individual image. It is understood that the sensor works periodically, i.e., for each individual image the gray values of all picture points of the individual image are measured. In particular, points the at least two integration intervals (i=1, 2 . . . ) are repeated for each individual image.

As known in the art, the charge level of any of the photodetectors of the sensor changes during an integration interval of that photodetector in response to an illumination of the photodetector during any of the integration intervals, typically due to a flow of a photocurrent depending on the intensity of the illumination. For any of the photodetectors at the end of any of the integration intervals of that photodetector, the charge level is a measurable quantity indicative of the amount of illumination incident on the photodetector during the integration interval. Typically the charge level depends on (and is in principle derivable from) the amount of electrical charge transported as photocurrent during integration. Further examples of possible measurable quantities from which the charge level may be derived or be based on are given below.

In the following, the value of the charge level of the photodetector at the beginning of any integration interval is denoted as zero value of the photodetector for that integration interval (denoted as $c_i^0$, with i=1, 2, . . . being the index of the integration interval considered), i.e. the integration of the photodetector starts at the respective zero value of the charge level of the photodetector. Thus, the value of the charge level at the end of any of the integration intervals being identical (or very close to or up to small deviations, for example, due to dark currents in the photodetectors) the corresponding zero value indicates that the photodetector was not illuminated during the integration interval (or that the illumination was below a minimum amount of illumination detectable by the photodetector). Furthermore, a saturation value (denoted as $c_i^{sat}$, i=1, 2, . . . ) of the charge level at the end of any of the integration intervals indicates the respective photodetector saturated during the integration interval, wherein the photodetector is called saturated if any further illumination during the integration interval does not (or would not) change the charge level any further. Typically, said saturation value is the same for each integration interval, picture point and individual image.

For the method as well as for the device according to the invention, it is necessary that for each individual image and for each of the picture points of the individual image, i.e. for each of the picture points of each of the individual images, the gray value of the picture point depends on two or more charge levels (denoted as $c_i$, i=1, 2, . . . ) of the at least one photodetector corresponding to the picture point, wherein the at least two charge levels are the charge levels at the respective ends (denoted as $t_i$, i=1, 2, . . . ) of at least two integration intervals (i=1, 2 . . . ) for the picture point. The at least two integration intervals for said picture point have different lengths. The at least two integration intervals thus correspond to different sensitivities of the respective photodetector. Typically, the value of any of those at least two charge levels depends only on the amount of illumination incident (and integrated) during the corresponding integration interval, i.e. the entire quantity of intensity or brightness, that affects the at least one photodetector during the whole integration interval, for any of those at least two integration intervals. Typically, when determining the gray values, the values of charge levels read out from the photodetectors are multiplied with a weighting factor. This weighting factor is typically anti-proportional to the length of the corresponding integration interval. The use of at least two integration intervals for each picture point of each individual image is known in the art, for example, in connection with so-called high dynamic range (HDR) sensors, such as so-called multi-readout sensors, split-pixels sensors, and well-capacity-adjustment (WCA) sensors. These generally known sensor designs, see for example "CMOS image sensors", by El Gamal, A. et al., published in: Circuits and Devices Magazine, IEEE, May-June 2005, Volume: 21, Issue: 3 Page(s): 6-20. Furthermore, see "A 256×256 CMOS imaging array with wide dynamic range pixels and column parallel digital output,", by S. J. Decker et al., published in IEEE J. Solid-State Circuits, vol. 33, pp. 2081-2091, December 1998. Moreover, see "A 640×512 CMOS image sensor with ultra-wide dynamic range floating-point pixel-level ADC", by D. Yang, A et al., published in IEEE J. Solid-State Circuits, vol. 34, pp. 1821-1834, December 1999. These documents are incorporated herein by reference. Possible sensor types that calculate the charge levels considering the time to saturation or other parameters only measurable within (but not measurable at the ends of) the integration intervals may be excluded.

The examination with regard to the at least one predefined feature comprises an examination of the picture points as to whether the picture points have gray values in a defined vicinity of one of at least one predefined gray value. In case that the picture points are grouped in image regions, as described above, the examination with regard to the at least one predefined feature may comprise an examination of the image regions as to whether the picture points of these image regions comprise gray values in a defined vicinity of one of at least one predefined gray value. The at least one predefined gray value is defined as the gray value that any (or each) of the picture points attains (or would have) if the charge levels of the at least one photodetector corresponding to the picture point at the ends of the at least two integration intervals for the picture point have (or had) either the corresponding zero value or the corresponding saturation value. The at least one predefined gray value may comprise exactly one or more than one predefined gray value.

For example, it may be envisaged that the image regions are formed only from picture points having gray values in a defined vicinity of one of at least one predefined gray value.

The given picture point or image region may then be classified as a (pulsing) light source or as part of a (pulsing) light source depending on the result of this examination. For example, as generally described above, the given picture point or image region may be classified as a (pulsing) light source or as part of a (pulsing) light source if (or, alternatively, only under the condition that) the result of this examination is positive. Alternatively or in addition, a positive result of this examination may also be interpreted as an indicator or evidence for the given picture point or image region being a (pulsing) light source or a part of a (pulsing) light source. Typically, in addition to this feature, the examination with regard to the at least one predefined feature comprises the examination of further features, such as those described herein or features already known in the art. Whether a given picture point or image region is classified as a (pulsing) light source or as part of a (pulsing) light source depends on whether it displays this feature and one, some or all of these further features.

Typically, the gray value corresponding to all charge levels being the corresponding zero values is not used as predefined gray value. This gray value generally corresponds to the darkest possible gray value. It may also be envisaged that the gray value corresponding to all charge levels being the corresponding saturation values is not used as predefined gray values. This gray values generally correspond to the lightest possible gray value. For example, one of the predefined gray values may defined as the gray value any (or each) of the picture points attains (or would have) if at least one of charge levels of the at least one photodetector corresponding to the picture point at the ends of the at least two integration intervals for the picture point has (or had) the corresponding zero value and at least one of charge levels of the at least one photodetector corresponding to the picture point at the ends of the at least two integration intervals for the picture point has the corresponding saturation value.

For example, the sensor may be a CMOS sensor configured to automatically perform well capacity adjustments, as generally known in the art. These sensors have one or more adjustment values (reset levels) which may fixedly defined for the sensor. With an adequately large brightness jump in at least one picture point (pixel) or in response to illumination with high intensity, such a sensor automatically carries out an adjustment for the at least one photodetector corresponding to this picture point in order to adapts its sensitivity for this picture point to the brightness in this picture point (pixel). As a consequence, it may happen that the adjustment value or a value close to the adjustment value is assigned to a picture point as a gray value, whenever a brightness jump or intense illumination triggers (i.e. renders necessary) an adjustment of the sensor for this picture point. With each of these resets, the sensor thus may assign the same adjustment value or at least a gray value in the vicinity of this adjustment value, to the picture points of this region. In this manner, a picture point or image region may have recurring uniform gray values. In connection with the present invention, it has been observed that this may happen significantly often in the case of pulsing light sources, such as pulsing LED light sources. Thus, according to one embodiment of the present invention, a repetitive occurrence of picture points with gray values identical with (or close to) said adjustment values of CMOS sensor equipped with well capacity adjustment functionality may serve as an indicator or evidence of a pulsing light source.

Furthermore, a repetitive occurrence of picture points with gray values identical with (or close to) a relatively small set of characteristic gray values can also be observed when using sensors of the type generally described above, in particular sensors with HDR, in particular CMOS sensors with HDR, such as those mentioned above, for acquiring images of pulsing light sources.

According to the present invention, the definition of the predefined gray values is such that the predefined gray values are identical or at least close to said characteristic gray values of the sensor which typically occur in connection with pulsing light sources. It should be noted that the predefined gray values are not a measure of an actual mean intensity or an actual mean brightness of the pulsing light source, but are correlated with the respective zero values and saturation values of the photodetectors of the sensor. These characteristic values therefore can be considered as artefacts of the sensor caused by pulsing light sources.

Generally, the predefined gray values depend on the characteristic of the sensor used. The characteristic of a sensor may be represented by its characteristic curve. The attributes that define the characteristic curve of the sensor may be adjustable, as it may be described in the specification of the sensor, as provided by the manufacturer, for example. Possible adjustable attributes comprise the saturation value, the integration times, the reset levels and/or the gray value function to calculate the gray values from the charge levels.

The predefined values may be identical, for example, one or more of he adjustment values (reset levels) or may be defined by the gray value function (denoted P below) to calculate gray values out of the charge levels, for example, by regarding any combination of saturation values and zero values of the charge levels (at the end of the integration intervals) as arguments of the function. It is also possible to determine the predefined gray values by performing a series of tests with a given sensor and using one or more pulsing light sources. By changing the repetition rate and the pulse duration, for example, said characteristic gray values may be observed and extracted from the corresponding picture points. For that purpose, preferably, the repetition rate of the light source is chosen greater than the image rate of the sensor, as described below. Typically, the number of characteristic gray values is less then 20, mostly less then 10 or even less then 5, depending on the given sensor type and characteristic curve.

For characteristic curves which consist of or comprise linear curve sections, it is also possible to determine the predefined gray values on the basis of the sensor's characteristic curve alone. Typically, said characteristic gray values indicating pulsing light sources are the values in the intersection of each linear curve with vertical gray value axis, representing the theoretical gray value at the start of the integration interval.

In principle, the actual characteristic curve of a given individual sensor may deviate from a pre-specified target characteristic curve within tolerance limits, this means, that the resulting predefined gray values of a given individual sensors may differ from those gray values which were intended with the actual sensor configuration chosen. Therefore, preferably, the predefined gray values are determined for each individual sensor, e.g. by performing a test series as described above or by measuring the actual characteristic curve of that sensor, preferably during or at the end of production. Preferably, however, the tolerance limits of the characteristic curves are narrow so that the variance of the predefined gray values of different individual sensors of a given type is small.

The method according to the invention utilises the fact that a pulsing light source which is captured with the camera and which irradiates an adequately strongly pulsing light power, typically saturates any of the photodetectors in the image regions assigned to the light source if any of the light pulses illuminates the photodetector during any of the integration intervals for any of the picture points. Since at least two integration intervals are used for each of the picture points of any of the individual images, it occurs that in one or more of the at least two integration intervals the photodetector is illuminated by the light pulses, thereby saturating the respective photodetector, and that, for the same picture point, in the remaining one or more other integration intervals for that picture point, the photodetector is not illuminated by the light pulses, such that the charge level of the photodetector only changes very little or not at all during these integration intervals. The picture point then receives a value identical or very close to one of the at least on predefined gray values.

A picture point having a gray value in a defined vicinity of the at least one predefined gray value, or an image region, whose picture points comprise gray values in a defined vicinity of the at least one predefined gray value, such as the above mentioned adjustment value (reset value) of the sensor, for example, is a strong indication for an illumination with light pulses emitted by a pulsing light source the brightness of which changing greatly within a very short time. This in particular represents the indication of a LED, since LED light sources are characterised by particularly short response behaviour.

Generally, the predefined (characteristic) gray values have to be identified in the resulting individual image. The accuracy and reliability of the described feature based on the predefined gray values for recognizing a pulsing light source depends on how cleary the predefined gray values could be identified. One criterion to identify the predefined gray values is on the basis of the gray values of a given picture itself. The significance of such features is best if the given predefined gray values occur only rarely in the absence of pulsing light sources. Other criterions could be added as described.

Furthermore, a sensitivity of the photodetectors of the sensor (or, equivalently, the intensity of the light pulses) may be such that if any one of the photodetectors is illuminated with one of the light pulses during one of the integration intervals, the photodetector saturates during the illumination with the light pulse and the charge level of the photodetector at the end of the respective integration interval has the corresponding saturation value, i.e., $c_i = c_i^{sat}$ with i being the index of the integration interval. Preferably, the sensitivity of the photodetectors (or, equivalently, the intensity of the light pulses) is such that any of the photodetectors saturates instantly as any of the light pulses impinges on the photodetector during any of the integration intervals. Generally, the accuracy and reliability of recognizing a pulsing light source improves for high intensity pulsing light sources.

Moreover, the sensitivity of the photodetectors may be such that the charge level of each photodetector of the sensor located in an area of the sensor associated with the pulsing light source does not change during any of said integration intervals of the photodetector if said photodetector is not illuminated by any of the light pulses during the integration interval and the charge level of the photodetector at the end of the integration interval has the corresponding zero value, i.e., $c_i = c_i^0$ with i being the index of the integration interval. In other words, the accuracy and reliability of the described feature based on the predefined gray values for recognizing a pulsing light source is highest for pulsing light sources located in dark environments.

Predefined gray values which are high (i.e. "bright") generally increase the significance of the features based on the predefined gray values described herein, particularly for detecting pulsing light sources in bright environments. In those cases, in which many of the measured gray values are close or even above the highest (i.e. "brightest") of the predefined gray values (e.g. in very bright environments), on the other hand, it may be envisaged to examine the picture points and/or the regions with respect to more than one feature, e.g. any of the features described herein and/or features already known in the art.

It further may be envisaged, that for any given individual image only those picture points are examined regarding the predefined features which have gray values above a preset cut-off value. Such a cut-off may help to reduce the number of picture points to be examined. It further may be envisaged, that the cut-off value is chosen such that at least one of the predefined gray values lies above this cut-off value. The accuracy and reliability of the described feature based on the predefined gray values for recognizing a pulsing light source in the case of using a cut-off value, is higher the more predefined gray values lie above the cut-off value. It may also envisaged that that in addition to those picture points having gray values above the cut-off, also those picture points having gray values in said close vicinity of the at least one predefined gray values are examined with regard to (further) predefined features.

Moreover, an image rate of the sensor, i.e. the number of individual images per unit time (e.g. per second), may be less than a pulse rate of the light pulses, i.e. the number of light pulses per unit time (e.g. per second). Additionally or alternatively, the length of at least one, or of all, of said at least two integration intervals for any of the image points for any of the individual images may be greater than a pulse duration of the light pulses. Additionally or alternatively, the length of the intervals between the light pulses may be greater than the shortest of the integration intervals or greater than each of the integration intervals for each of the picture points of each of the individual images. Under such circumstances, the probability of pixels points having gray values identical or close to the predefined gray values increases, thereby increasing the accuracy and reliability of recognizing a pulsing light source.

In one embodiment, for each picture point of each of the individual images the charge levels are read out from the one or more photodetectors corresponding to the picture point at the ends of each of the integration intervals for said picture point. This may be accomplished, for example, if the sensor is equipped with a multi-readout functionality for each of the photodetectors of the sensors. In the case of the above mentioned one-to-many correspondence between picture points and photodetectors, for each picture point of each of the individual images, each of the photodetectors corresponding to the picture point is integrated only during one of the at least two integration intervals for the picture point (i.e. one integration interval per photodetector) and is read out at the end of the respective integration interval.

Alternatively, in particular if the sensor is equipped with a well capacity adjustment functionality, it may be envisaged that for each picture point of each of the individual images the at least two integration intervals for the picture point (immediately) follow each other (and do not overlap in contrast to the previous examples). In the case of well capacity adjustment, the charge level of the at least one photodetector corresponding to the picture point is reset to one of at least one predefined adjustment value of the sensor at the end of any one of the integration intervals for said picture point if the charge level of the at least one photodetector is beyond (due to strong illumination) the adjustment value at the end of said integration interval. Consequently, said adjustment value is the charge level of said photodetector at the beginning of the (immediately) following integration interval for said picture point of said individual image, i.e. the zero value of the following integration level set to said adjustment value. Typically, for the last of the at least two integration intervals no well capacity adjustment is provided, but only at the ends of the at least one integration interval preceding the last integration interval.

If for a given picture point no adjustments (resets to adjustment values) of the charge level has been performed, then the integration intervals for that picture point may be interpreted as one single continuous integration interval, the length of which being equal to the sum of the lengths of the at least two integration intervals. Furthermore, if for a given picture point one or more adjustments (resets to adjustment values) of the charge level have been performed, then the at least one integration interval following the latest adjustment may be interpreted as one single continuous integration interval, the length of which being equal to the sum of the lengths of said at least one integration interval following the latest adjustment. In terms of such a combined integration interval, the gray value for said picture point may by derived from the change of the charge level during this combined integration interval, typically by multiplying the (absolute) value of the change of the charge level with a weighting factor, which may be anti-proportional to the length of the combined integration interval.

Note that, depending on the definition of the charge level and on the configuration of the photodetector, the charge level may be (monotonously) decreasing with increasing amount of illumination incident on a photodetector during an integration interval. Then the charge level is reset to one of the at least one predefined adjustment value if the charge level has fallen below (i.e. is less than) the adjustment value at the end of said integration interval. If, however, the charge level is (monotonously) increasing with increasing amount of illumination incident on a photodetector during an integration interval, then the charge level is reset to one of the at least one predefined adjustment value if the charge level has risen above (i.e. is greater than) the adjustment value at the end of said integration interval.

The charge level of the at least one photodetector corresponding to the picture point is read out from the at least one photodetector corresponding to the picture point at the end of the last integration interval for said picture point of said individual image. For any picture point of any individual image the charge level read-out at end of last integration interval depends on whether any well capacity adjustments have been performed for the integration intervals for that picture point. In particular pulsing light sources emitting short but intense light pulse may trigger well capacity adjustments which increases the probability of gray values identical to or near the respective adjustment values, in particularly in dark environments.

The at least one predefined gray value may therefore by defined as the at least one predefined adjustment value of the sensor or may include the at least one predefined adjustment value of the sensor.

The sensor may also comprise a processing circuitry or a processing unit configured to process the read-out charge levels and derive the gray values of the pictures point from the respective charge levels.

Typically, the sensor is configured such that for each of the picture points of each of the individual images, the gray value of the picture point corresponds to the charge level of the at least one photodetector corresponding to the picture point at the end of the longest of the at least two integration intervals for that picture point at the end of which the at least one photodetector is not saturated. In particular, this applies sensors with well capacity adjustment functionality and to sensors with multi-readout functionality, as described above.

Moreover, one can envisage such image regions lying in close proximity to one another being combined into a total region which is classified as assigned to an individual light source. Such total regions have the great advantage that they are particularly stable with regard to their shape and their position within the individual images and are therefore particularly reliable to re-recognise and track over several individual images. This is particularly advantageous if one or more further features of the associated image regions are to be examined in consecutive individual images, as is described further below.

The examination of such features can then be carried out in each case also on the level of the total regions. This has the advantage of a greater stability of these features and thus leads to a greater reliability of the method. In this context, when one hereinafter speaks of an image region, this is always to also be understood as such a total region composed of adjacent image regions.

Further features with regard to which the image regions can be examined are described hereinafter. The reliability and the accuracy of the method can be increased further by way of adding one, several or all of these features as further necessary or sufficient conditions or as further indicators for a classification of an image region as a pulsing light source or as a part of a pulsing light source. In cases that a given feature is considered as a further necessary condition the wording "depending on whether" used below would be replaced by "if moreover", respectively.

In a further development of the method, one envisages the given image region being classified as a pulsing light source or as part of a pulsing light source, depending on whether a relative share of picture points of the given image region, whose gray values correspond exactly to the adjustment value of the sensor, exceeds a predefined threshold value.

Moreover, one can envisage the given image region being classified as a pulsing light source or as part of a pulsing light source, depending on whether a variance of the gray values of the picture points of the given image region falls short of a predefined threshold value. Alternatively or additionally, one can examine as to whether a ratio which is formed by dividing a variance of the gray values of the picture points of the given image region by a variance of the gray values of all picture points of the given individual image, falls short of a predefined threshold value. These features which depend on the variance of the gray values of picture points may significantly increase the reliability of the proposed method and device for recognising pulsing light sources, in particular when some or all of the at least one predefined gray values are close to average gray values of the picture points measured, for example when a pulsing light source to be recognised is located in a bright environment. Said predefined threshold may be defined on the basis (e.g. proportional to the value of) the variance the gray values of picture point of an individual picture taken without illuminating the sensor (corresponding to the sensor specific background noise).

Moreover, it is possible for the given picture point or image region to be classified as a pulsing light source or as part of a pulsing light source, depending on whether the given picture point or image region is re-recognised again in individual images which in the sequence are subsequent to the given individual image. Such a re-recognition and tracking can be simplified by way of this, if several image regions lying in close proximity to one another, with gray values in the proximity of adjustment values, as described, can be combined into total regions.

The following features of image regions are each related exclusively to image regions which can be re-recognised (identified) and tracked, over several consecutive individual images (frames) of the (image) sequence.

In particular, one can envisage the given image region being classified as a pulsing light source or as part of a pulsing light source, depending on whether in the individual images following the individual image, an average value of the gray values of the picture points of the given image region changes by more than a defined threshold value. This is an indication of a brightness jump in this image region and is thus characteristic of a pulsing light source.

Moreover, one can envisage the given picture point or image region being classified as a pulsing light source or as part of a pulsing light source, depending on whether in the subsequent individual images, the gray values of the picture point or picture points of the given image region lie in the defined vicinity of the adjustment value of the sensor in a manner recurring with a periodicity, wherein the periodicity lies above a threshold vale. Specifically, it has been found that it is typical in particular for LED headlights, for temporally recurring brightness courses to occur in the assigned image regions. These temporal patterns in a non-trivial manner depend on the impulse frequency and the impulse duration of the LED(s) of the headlight, on the read-out frequency and on the illumination duration of the sensor, as well as on the a phase shift between the read-out and activation of the LED(S) of the headlight (or generally of the pulsing light source).

An evaluation of such a periodicity which is particularly simple and which can be carried out with relatively little effort and memory requirement can be achieved via the computation of the Hamming distance between a first vector and a second vector, wherein in a nth entry of the first vector, it is specified whether the gray values of the given image region in an individual image which precedes the given individual image in the sequence of individual images at the nth location (in the sequence thus exactly n−1 further individual images are located between this individual image and the given individual image) lie within the defined vicinity of the adjustment value of the sensor or lie outside the defined vicinity of the adjustment value of the sensor. The second vector is formed from the first vector by way of a bitwise shifting of the first vector by p bits.

The computation of the Hamming distance is carried out repeatedly for different values of p, wherein finally that value of p, at which the Hamming distance is minimal, is determined as the period of the image region. Finally, the periodicity of the image region is computed from the Hamming distance belonging to this period, wherein generally a small Hamming distance means a large periodicity.

Finally, the device according to the invention for recognising light sources comprises a camera for detecting a sequence of individual images. This camera is of the type described above in connection with the proposed method. In particular it comprises a light-sensitive sensor for measuring gray values of picture points of the individual images as described. The device is configured to carry out all steps of the method proposed and described herein. Furthermore, the device may be configured to carry out all further optional steps of the proposed method as described herein. For that purpose the device comprises an evaluation unit of the type described. The device may also comprise read-out circuitry configured to read out the photodetectors in the way described in connection with the proposed method. The device may also comprise a memory configured to store the at least one predefined gray value.

The evaluation unit may thus be configured to combine at least a part of the picture points of the individual images, on account of their gray values, into image regions as described in connection with the proposed method. The evaluation unit is further configured to examine the image points or the image regions with regard to the predefined features as described in connection with the proposed method.

Moreover, the sensor of the device may be of any of the types described above in connection with the proposed method. In particular, the sensor may be a CMOS sensor, in particular a high dynamic range (HDR) sensors, for example a multi-readout sensor, a split-pixels sensors, or a well-capacity-adjustment (WCA) sensor.

As with the method according to the invention, with this device too, one utilises the fact that a pulsing light source which is acquired with the camera and which beams an adequately greatly pulsing light power, may, for example, trigger adjustments in the image regions assigned to the light sources, in the sensor of the camera as described in connection with the proposed method. An image region, whose picture points have gray values in a defined vicinity of the predefined gray values, which may be defined as the adjustment values of the sensor, is characteristic of a light source whose brightness has very greatly changed in this time. This in particular represents a hint of an LED, since LED light sources are characterised by a particularly short response behaviour.

Thus pulsing light sources can be recognised in a particularly reliable manner with the device according to the invention.

Advantageous further developments of the device result due to the fact that the evaluation unit of the device is configured for carrying out a method of the type suggested here. The advantages already described above result depending on the embodiment of this method, and in particular an even further increased reliability in the recognition of pulsing light sources, in particular of LED headlights in a pulse operation.

Finally, a vehicle with a driver assistance system is suggested, which comprises a device of the type suggested here, and which in particular is configured to recognise headlights and/or rear lights of other vehicles, in particular pulsing light sources such as LED headlights and/or LED rear lights, wherein the camera of the device is preferably aligned in the direction of a front side of the vehicle.

The invention is hereinafter explained in more detail by way of various special embodiment examples, which are represented schematically in FIGS. 1 to 5. It shows:

FIG. 1 a schematic representation of a vehicle 1 with a driver assistance system which comprises a device of the type suggested, FIG. 2 diagrammatic representation of the charge level of a photodetector of a multi-readout sensor, the charge level changing in response to illumination with a continuous light source, FIG. 3 diagrammatic representation of the charge level of a photodetector of a multi-readout sensor, the charge level changing in response to illumination with a pulsing light source, FIG. 4 diagrammatic representation of the charge level of a photodetector of a well capacity adjustment sensor, the charge level changing in response to illumination with a continuous light source, and FIG. 5 diagrammatic representation of the charge level of a photodetector of a well capacity adjustment sensor, the charge level changing in response to illumination with a pulsing light source.

Figure 1:
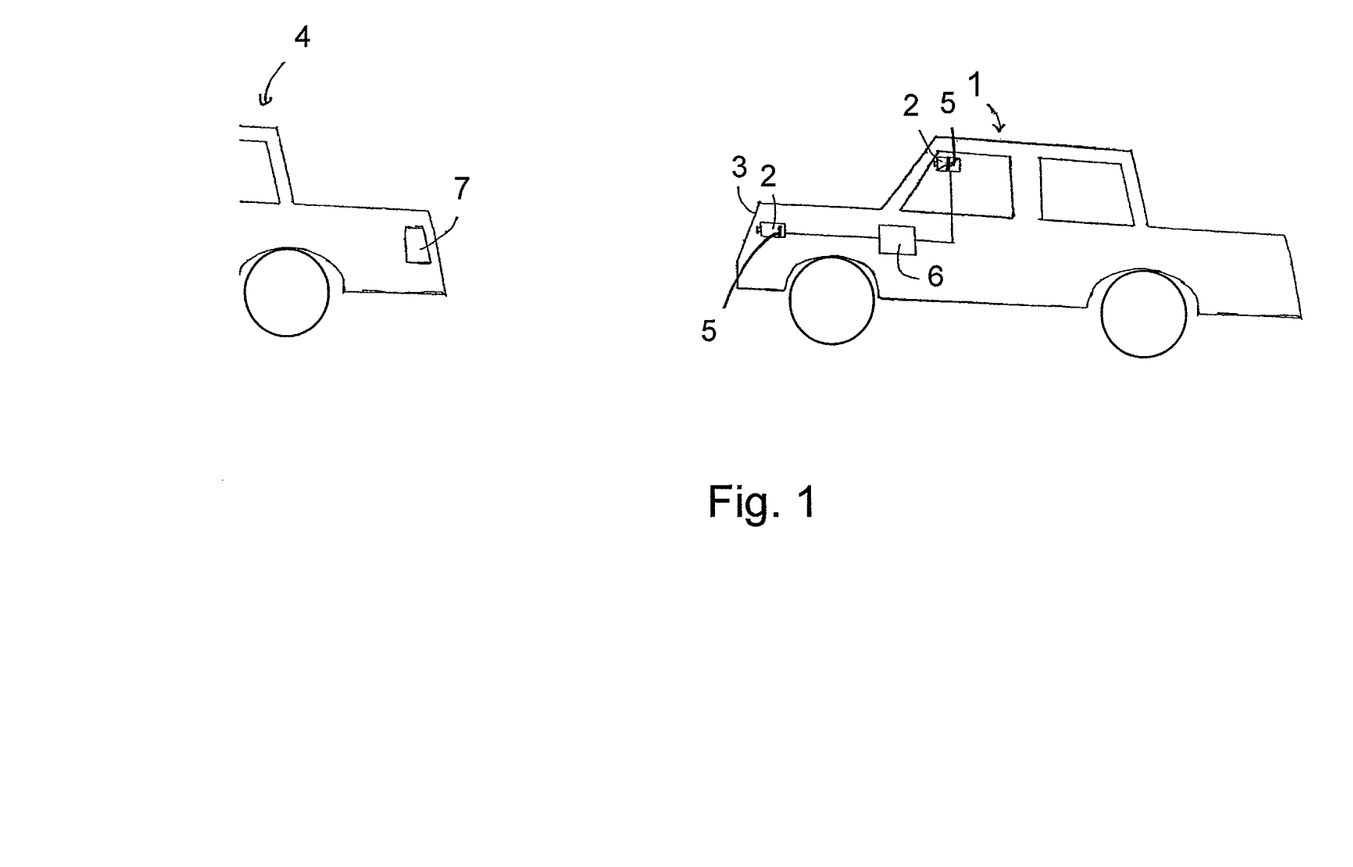

FIG. 1 shows a schematic representation of a vehicle 1 with a driver assistance system which comprises a device of the type suggested here, which is configured for carrying out a method of the type put forward here, for recognising, tracking and classifying light sources and pulsing light sources, such as in particular LED headlights.

This device comprises two cameras 2 which are aligned in the direction of the front side of the vehicle, for detecting a sequence of individual images of vehicles 4 which are in front or are oncoming. In other embodiments, the device may comprise only one such camera, or more than two cameras. These cameras in each case comprise a light-sensitive sensor 5 for measuring gray values of picture points of individual images. Moreover, the device comprises an evaluation unit 6 which is connected to the two cameras 5 which may be configured to combine at least a part of the picture points of the individual images of the two cameras 5, on account of their gray values, into coherent image regions of uniform gray values, to subsequently examine picture points and/or the image regions with regard to predefined features and to classify a given picture point or image region as a light source 7 or as a part of a light source 7 depending on whether these features are displayed.

The sensors are sensors generally known in the art, for example CMOS sensors with high dynamic HDR functionality, such as multi-readout sensors, split-pixel sensors, or well-capacity-adjustment (WCA) sensors.

Subsequently, all or some of the picture points and/or, if previously formed in the evaluation unit, all or some of said image regions are examined in the evaluation unit with regard to one or more predefined features. A given picture point or image region is classified as a (pulsing) light source or as part of a (pulsing) light source depending on whether it displays one, some or all of these features. For example, it may by envisaged that said picture point or region is classified as a (pulsing) light source or as part of a (pulsing) light source only if it displays some, one or all these features. Furthermore, it may by envisaged that one, some or all of said features are considered necessary for a picture point or region to be classified as a (pulsing) light source or as a part of a (pulsing) light source; one, some or all of said features may be considered sufficient for a picture point or a region to be classified as a (pulsing) light source or as part of a (pulsing) light source. It is also possible that one, some or all of said features are considered as an indicator or evidence that a picture point or region corresponds to a (pulsing) light source or to a part of a (pulsing) light source.

Some of the features may be defined, as some of the examples given below, on the level of regions of picture points and may be not applicable on the level of individual picture points.

It may be envisaged that said regions are formed only of those picture points which display one, some or all of the predefined features, such as any of the predefined features discussed below. It may further be envisaged, that these regions are then examined in the evaluation unit with regard to one or more (further) predefined features.

The gray values of the picture points of the individual images are measured by means of said photodetectors of the sensor. There may by a one-to-one correspondence between the picture points and the photodetectors or a one-to-many correspondence between the picture points and the photodetectors. In the first case, the gray value of any one of the picture points is determined from charge levels (which described below) of exactly one of the photodetectors. In the second case, the gray value of any one of the picture points is determined from charge levels of several of the photodetectors. The many-to-one correspondence may be accomplished be means of a micro-lens system, as generally known in the art as split-pixel design.

In order to measure the gray value of any of the picture points of any of the individual images, the one or more photodetectors corresponding to the picture point is illuminated during at least two (i.e. two or more) integration (time) intervals of that picture point of that individual image.

Further details about the sensors and the measurement of the gray values are presented along the discussion of FIGS. 2-5 below.

Generally, the charge level of any of the photodetectors of the sensor is indicative of the amount of illumination of the photodetector during any of the integration intervals. Thus the gray value of any picture point is derivable from the charge levels of the photodetectors. The value of the charge level of the photodetector at the beginning of any integration interval is denoted as zero value of the photodetector for that integration interval (denoted as $c_i^0$, with i=1, 2, ... being the index of the integration interval considered), i.e. the integration of the photodetector starts at the respective zero value of the charge level of the photodetector. Thus, the value of the charge level at the end of any of the integration intervals being identical (or very close to) the corresponding zero value indicates that the photodetector was not illuminated during the integration interval (or that the illumination was below a minimum amount of illumination detectable by the photodetector). Furthermore, a saturation value (denoted as $c_i^{sat}$, i=1, 2, ... ) of the charge level at the end of any of the integration intervals indicates the respective photodetector saturated during the integration interval.

As explained in greater detail with respect to FIGS. 2-5, it is a general requirement of the present invention that for each individual image and for each of the picture points of the individual image, the gray value of the picture point depends on two or more charge levels (denoted as $c_i$, i=1, 2, ... ) of the at least one photodetector corresponding to the picture point, wherein the at least two charge levels are the charge levels at the respective ends (denoted as $t_i$, i=1, 2, ... ) of at least two integration intervals (i=1, 2 ... ) for the picture point. The at least two integration intervals for said picture point have different lengths and thus correspond to different sensitivities of the respective photodetector. The at least two integration intervals for any given picture point of any given individual image may follow each other, see FIGS. 2 and 3, or overlap, see FIGS. 4 and 5.

The examination with regard to the at least one predefined feature comprises an examination of the picture points as to whether the picture points have gray values in a defined vicinity of one of at least one predefined gray value. In case that the picture points are grouped in image regions the examination with regard to the at least one predefined feature may comprise an examination of the image regions as to whether the picture points of these image regions comprise gray values in a defined vicinity of one of at least one predefined gray value.

The at least one predefined gray value is generally defined as the gray value that any (or each) of the picture points attains (or would have) if the charge levels of the at least one photodetector corresponding to the picture point at the ends of the at least two integration intervals for the picture point have (or had) either the corresponding zero value or the corresponding saturation value, see FIGS. 2-5.

The predefined gray values may be stored in a memory and read out from the memory by the evaluation unit. It is also possible that the predefined gray values are calculated by the evaluation unit. Typically, the predefined gray values are the same for all picture points of any given individual image. Furthermore, the predefined gray values may be the same for all individual images; the predefined gray values may also change over time, for example depending on a current work mode of the sensor.

It may be envisaged that the image regions are formed only from picture points having gray values in a defined vicinity of one of at least one predefined gray value.

The given picture point or image region may then be classified as a pulsing light source or as part of a pulsing light source depending on the result of this examination. For example, the given picture point or image region may be classified as a pulsing light source or as part of a pulsing light source if the result of this examination is positive. A positive result of this examination may also be interpreted as an indicator or evidence for the given picture point or image region being a pulsing light source or a part of a pulsing light source.

In the following, various characteristics and configurations of sensors suitable for the use with the present invention, for instance as sensor 5 of the embodiment shown in FIG. 1, are discussed.

Figure 2:
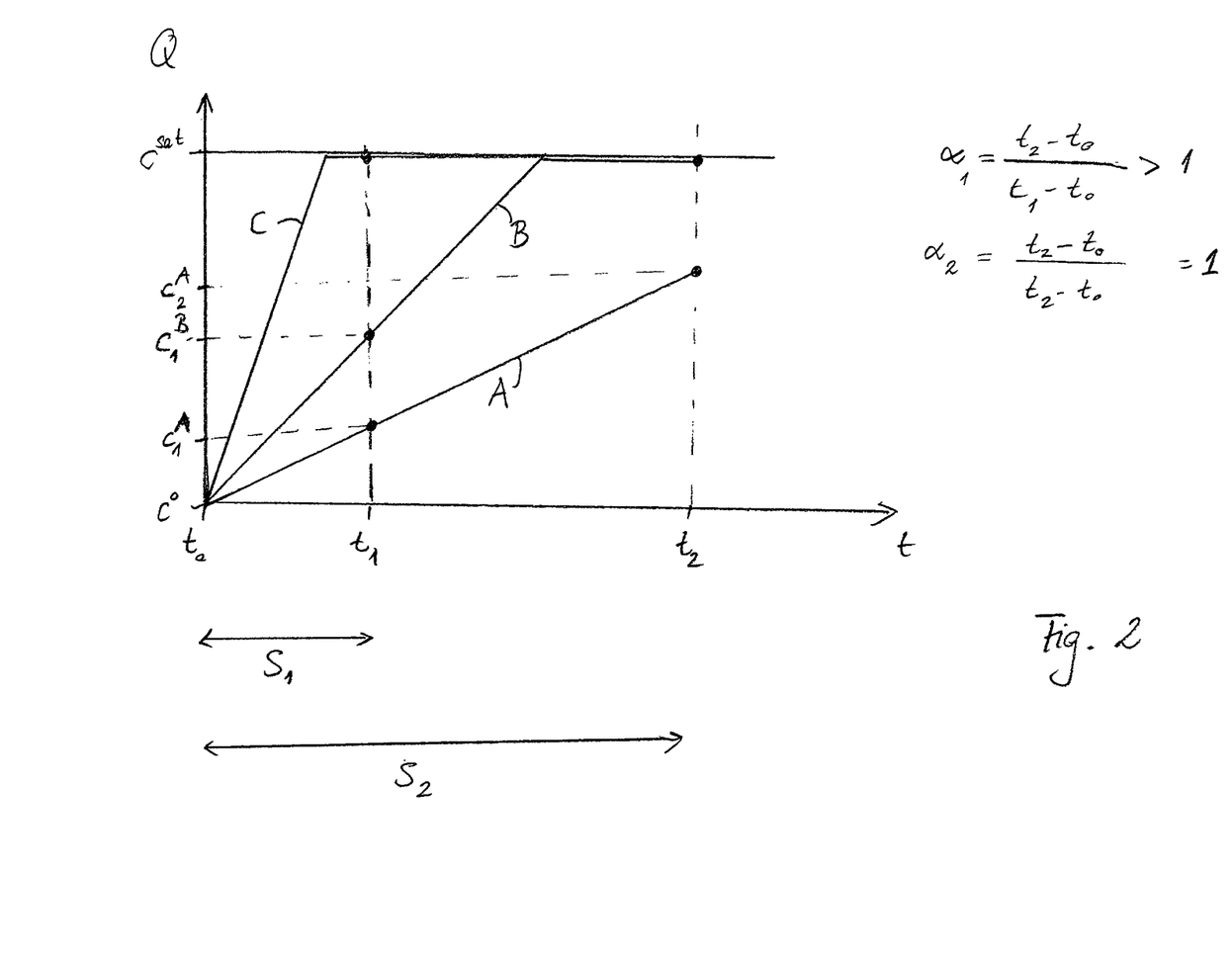
Figure 3:
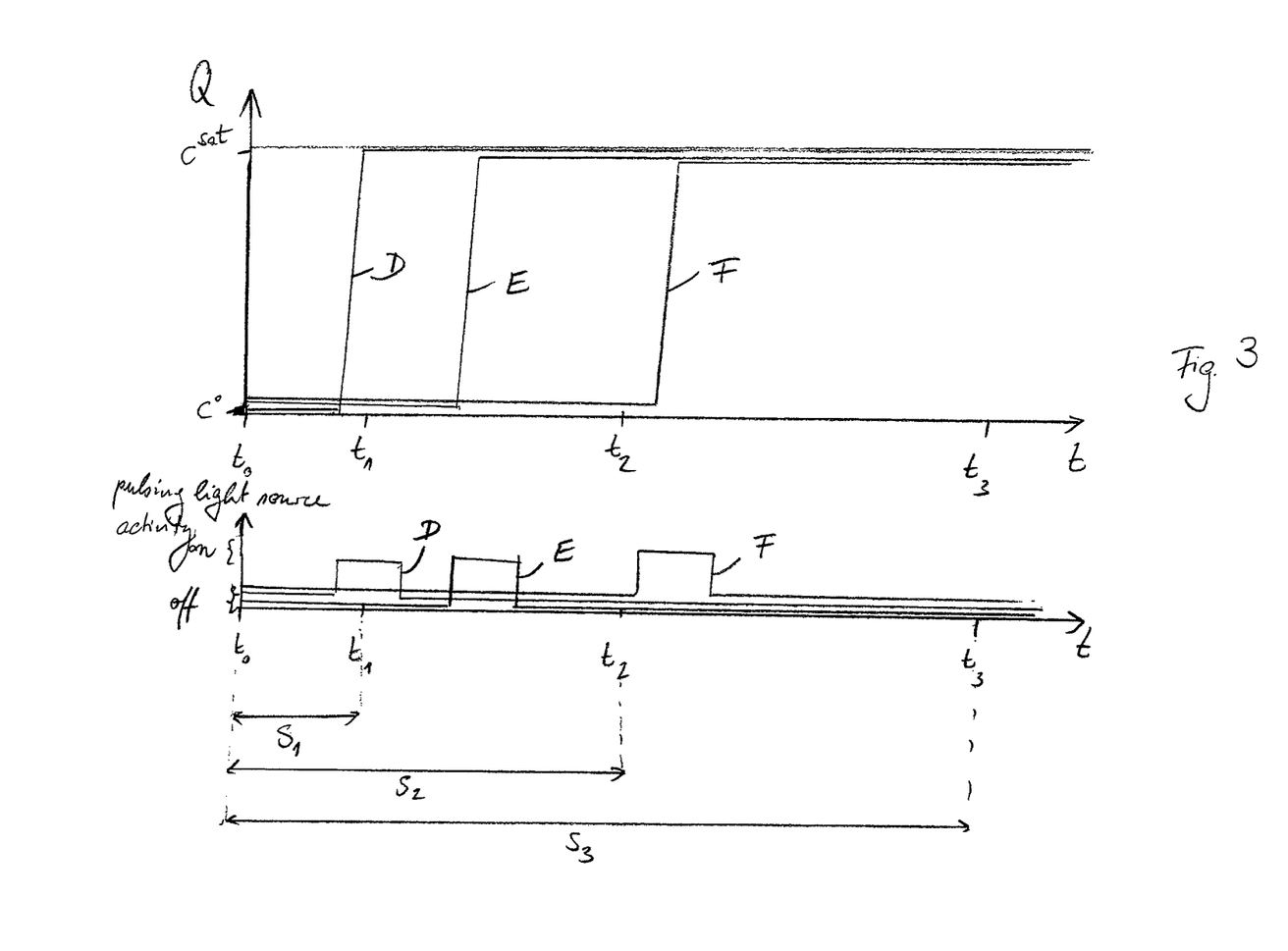

The sensor used with the present invention may be a HDR CMOS sensor with multi-readout functionality or with well capacity adjustment functionality, for example. FIG. 2 shows a diagrammatic representation of the charge level of one individual photodetector of a specific embodiment of a sensor with multi-readout functionality. In this example, the charge level changes during the two integration intervals $S_1$ and $S_2$ due to illumination with light of constant intensity emitted by a non-pulsing light source; shown are three scenarios A, B, C with three different light intensities. FIG. 3 shows a diagrammatic representation of the charge level of a photodetector of a sensor of the same type as it changes during the three integration intervals $S_1$, $S_2$ and $S_3$ due to illumination with light pulses emitted by a pulsing light source; shown are three scenarios D, E, and F with three different pulse rates.

In both cases, the integration interval S1 begins at time t0 and ends at time t1, whereas the integration interval S2 begins at time t0 and ends at time t2 (and integration interval S3 beginning at time t0 and ending at time t3); integration interval S1 being shorter than integration interval S2 (which in turn is shorter than S3). The charges levels of the photodetector are read out by means of a read-out circuitry at times t1 and t2 (and t3) and may be transmitted to the evaluation unit 6. In alternative configurations, the integration intervals of any of the picture points of any of the individual images start subsequently (at different start times, for example $t_1^a < t_2^a < \ldots$, i denoting the index of the integration intervals) and end synchronously at the same end time (at the same end time $t_1 = t_2 = \ldots$, i denoting the index of the integration intervals).

Hence, with this sensor embodiment, for each picture point of each of the individual images the charge levels are read out from the one or more photodetectors corresponding to the picture point at the ends of each of the integration intervals for said picture point. In the case of the above mentioned one-to-many correspondence between picture points and photodetectors, such as for the split-pixels design, for each picture point of each of the individual images, each of the photodetectors corresponding to the picture point is integrated only during one of the at least two integration intervals for the picture point (i.e. one integration interval per photodetector) and is read out at the end of the respective integration interval.

It is understood that the sensor works periodically, i.e., for each individual image the gray values of all picture points of the individual image are measured. In particular, for any of the picture points the at least two integration intervals (i=1, 2 . . . ) are repeated for each individual image. Furthermore, the charge levels of the photodetectors may be reset (to said zero values) at or before the beginning of the first integration interval for each picture point of each of the individual images.

Only for the sake of convention and without loss of generality, it is assumed in FIGS. 2 and 3 (as for the embodiments corresponding to FIGS. 4 and 5) that the charge level monotonously increases with the amount of illumination incident on a photodetector during the integration intervals. In principle, it could also be assumed, that the charge level monotonously decreases with the amount of illumination incident on a photodetector during an integration interval. For example, the photodetector may comprise a photosensitive element, such as a photodiode, and a capacitor which is electrically charged at a predefined potential difference (voltage) at the beginning of any one of the integration intervals. The capacitor may be an integral part of the photodiode. Depending on the intensity of light incident on the photosensitive element during the integration interval, it allows the potential difference of the capacitor to change during the integration interval. Typically, the configuration of the photodetector is such that the potential difference of the capacitor decreases during illumination of the photosensitive element during an integration interval due to the flow of a photocurrent through the photodiode. In principle, however, the configuration of the photodetector may also be such that the potential difference of the capacitor increases during illumination of the photosensitive during an integration interval.

In the example according to FIGS. 2 to 5, the charge level Q of the photodetector is defined as $Q = c^{sat} - c^{capacity}$, for example, wherein $c^{capacity}$ is defined as the amount of charge stored in the capacitor. At t0, the capacitor of the photodetector is charged with an amount of charge equal to $c^{sat}$, so that $Q=0$. Alternatively, the potential difference of the capacitor, the amount of electrical energy stored in the capacitor, or any function of one or more of these quantities may also serve for defining the charge level. In this case the charge level representing the saturation value may be different for any of the integration intervals.

As can be seen from FIGS. 2 and 3 the photodetector saturates when the charge level reaches a saturation value $c_i^{sat}$ (i=1, 2, . . . denoting the integration interval). At this point, any continued illumination during the integration interval does not change the charge level any further.

In general, the gray value (P) of each of the picture points of any of the individual images may be interpreted as the value of a gray-value function P, the value of the gray-value function depending on the two or more charge levels $P=P(c_1, c_2, \ldots)$.

For example, P may be defined such that for each of the picture points of each of the individual images, the gray value of the picture point corresponds to the charge level of the photodetector corresponding to the picture point at the end of the longest of the at least two integration intervals for that picture point at the end of which the at least one photodetector is not saturated. For example, the gray value function may also prescribe to multiply the value of this charge level with a weighting factor $\alpha_i$ anti-proportional to the length of the corresponding integration interval. In the example shown in FIG. 2, this would mean that in scenario A, the gray value would be $P=\alpha_2 c_2^A$; in scenario B the gray value would be $P=\alpha_1 c_1^B$; in scenario C the gray value would be $P=\alpha_1 c^{sat}$. In the example shown in FIG. 3, in scenario D, the gray value would be $P=\alpha_1 c^{sat}$; in scenario E the gray value would be $P=\alpha_2 c^{sat}$; in scenario F the gray value would be $P=\alpha_3 c^{sat}$.

If the gray value function P is defined as the sum of all read-out charge levels, each weighted with the corresponding weighting factor $\alpha_1$, this would mean that in scenario A, the gray value would be $P=\alpha_1 c_1^A+\alpha_2 c_2^A$; in scenario B the gray value would be $P=\alpha_1 c_1^B+\alpha_2 c^{sat}$; in scenario C the gray value would be $P=\alpha_2 c^{sat}+\alpha_1 c^{sat}$. In the example shown in FIG. 3, in scenario D, the gray value would be $P=\alpha_1 c^{sat}+\alpha_2 c^{sat}$; in scenario E the gray value would be $P=\alpha_1 c_1^0+\alpha_2 c^{sat}+\alpha_3 c^{sat}$; in scenario F the gray value would be $P=\alpha_1 c_1^0+\alpha_2 c_2^0+\alpha_3 c^{sat}$. One observes, that in scenarios D, E, F, the gray values depend only from the values of $c_1^0$ and $c^{sat}$.

The predefined gray values are therefore defined as the values of $P(c_1, c_2, \ldots)$ with the values of the charge level $c_i$ being either $c_i^0$ or $c_i^{sat}$ for all $i=1, 2, \ldots$. Note that in the present case, as in most cases, the value $c_i^{sat}$ is independent of i, i.e., the same for all integration intervals. Furthermore, as in most cases with integration intervals beginning synchronously, the value $c_i^0$ is independent of i, i.e., the same for all integration intervals.

As seen from FIGS. 2 and 3 (and from FIGS. 4 and 5) the sensitivity of the photodetectors of the sensor (equivalently: the intensity of the light pulses) is such that if any one of the photodetectors is illuminated with one of the light pulses during one of the integration intervals, the photodetector saturates during the illumination with the light pulse and the charge level of the photodetector at the end of the respective integration interval has the corresponding saturation value, i.e., $c_i=c_i^{sat}$ with i being the index of the integration interval.

Moreover, the sensitivity of the photodetectors (or equivalently, the brightness of the environment of the pulsing light source) is such that the charge level of each photodetector of the sensor located in an area of the sensor associated with the pulsing light source does not change during any of said integration intervals of the photodetector if said photodetector is not illuminated by any of the light pulses during the integration interval and the charge level of the photodetector at the end of the integration interval has the corresponding zero value, i.e., $c_i=c_i^0$ with i being the index of the integration interval.

Moreover, in these examples an image rate of the sensor, i.e. the number of individual images per unit time (e.g. per second), is less than a pulse rate of the light pulses, i.e. the number of light pulses per unit time (e.g. per second). Additionally, the length of at least one, or of all, of said at least two integration intervals for any of the image points may be greater than a pulse duration of the light pulses. Under such circumstances, the probability of pixels points having gray values identical or close to the predefined gray values increases, thereby increasing the accuracy and reliability of recognizing a pulsing light source.

Figure 4:
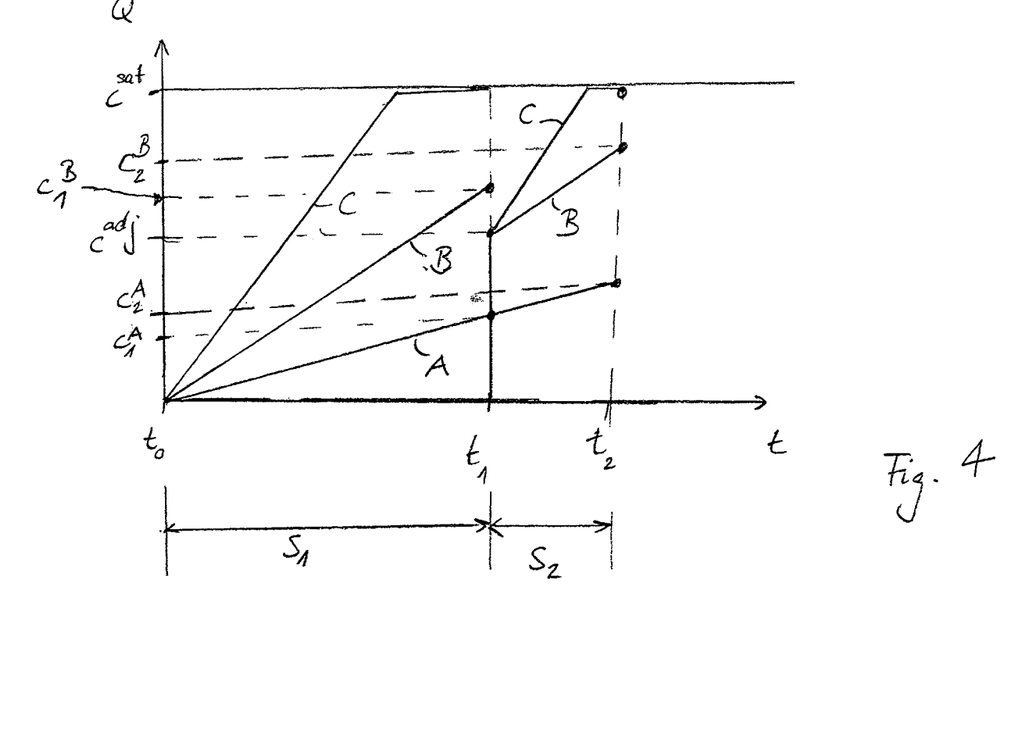
Figure 5:
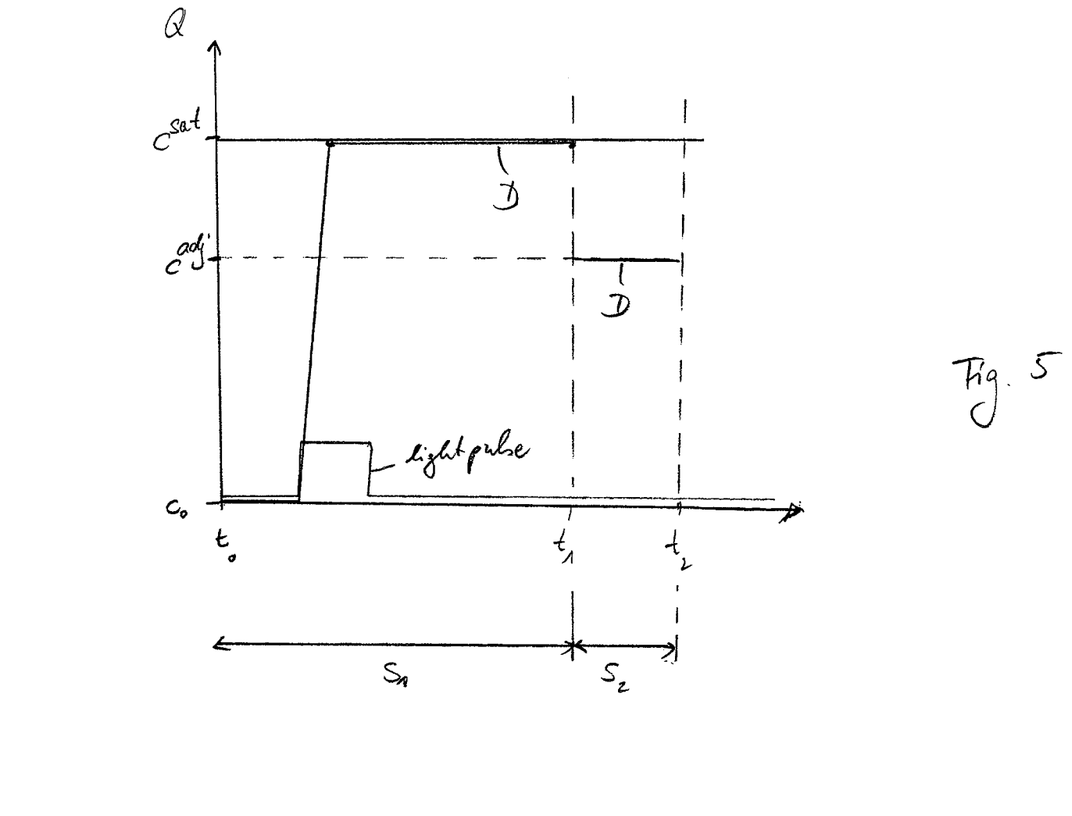

FIG. 4 shows a diagrammatic representation of the charge level of one individual photodetector of a specific embodiment of a sensor with well capacity adjustment functionality. In this example, analogously to FIG. 2, the charge level changes during the two integration intervals $S_1$ and $S_2$ due to illumination with light of constant intensity emitted by a non-pulsing light source; shown are three scenarios A, B, C with three different light intensities. FIG. 5 shows a diagrammatic representation of the charge level of a photodetector of a sensor of the same type as it changes during the two integration intervals $S_1$ and $S_2$ due to illumination with light pulses emitted by a pulsing light source; shown is one scenario D.

In both cases, the integration interval S1 begins at time t0 and ends at time t1, whereas the integration interval S2 begins at time t1 and ends at time t2; integration interval S1 being longer than integration interval S2. The charge levels of the photodetector are read out by means of a read-out circuitry at t2, i.e. the charge level is read out from the photodetector at the end of the last integration interval by a read-out circuitry of the sensor and may be further processed by a processing unit of the sensor which is configured to determine the gray values depending on the read-out charge levels. The gray values may then be transmitted to the evaluation unit 6.

As it is the case in scenarios B and C shown in FIG. 4 and in scenario D shown in FIG. 5, the charge level of the photodetector is reset to a predefined adjustment value $c_{adj}$ of the sensor at the end of integration interval S1, since the charge level of photodetector is greater than (due to the illumination with the intense light pulse) the adjustment value $c_{adj}$ at the end of said integration interval. In other words, the capacity is recharged with an amount of charge equal to $c_{adj}$ at the resets. Consequently, the adjustment value is the charge level of said photodetector at the beginning of the (immediately) following integration interval S2, i.e. the zero value of the following integration level set to said adjustment value, $c_2^0=c_{adj}$.

As can be clearly seen in FIGS. 4 and 5, the charge level read-out at t2 depends on whether a well capacity adjustment has been performed. Pulsing light sources emitting short and intense light pulse may trigger well capacity adjustments and thereby strongly increase the probability of gray values identical to or near the respective adjustment values, in particularly under the conditions described above.

The (at least one) predefined gray value may therefore by defined as the at least one predefined adjustment value of the sensor or may include the at least one predefined adjustment value of the sensor.

Returning to FIG. 1, the sensors 5 may be, for example, in each case CMOS sensors of the types described above. Each sensor may have a gray value depth of 12 bits, wherein one of the predefined gray values may correspond in each case, for example, to a gray value of 345. The defined vicinity of the adjustment value may lie between gray values of 334 and 369. Generally, it is advantageous to define the vicinity of the adjustment value with a width of about 10% of the adjustment value or therebelow. The adjustment value may lie roughly centrally in this vicinity.

The examination with regard to predefined features may also include an examination of the image regions as to whether the picture points of these image regions have gray values in said vicinity of the adjustment value of the sensor, and wherein the evaluation unit is moreover configured to classify the given image region as a pulsing light source or as a part of a pulsing light source, in the case of a positive result of this examination.

Thereby, the device is configured to recognise headlights and/or rear lights of other vehicles, in particular pulsing light sources such as LED headlights and LED rear lights 7. For this purpose, the cameras 5 are aligned in the direction of the front side 3 of the vehicle 1.

Moreover, image regions which lie in close proximity to one another may be combined by the evaluation unit into a total region which is then classified as being assigned to an individual light source 7.

Moreover, with the device, for further increasing the reliability of the recognition, tracking and classification of light sources, the image regions to be examined, as well as the total regions formed from the image regions to be examined may be examined with regard to all subsequent features, and an image region or total region which is examined in this manner may be classified as a pulsing light source or as part of a pulsing light source if it displays one, some or all the features mentioned here. Hereinafter, one speaks merely of image regions to be examined. What is meant each time is also the total regions formed from image regions to be tested (see above).

Belonging to these features to be examined may be that a relative share of picture points of the given image region (to be examined), whose gray values correspond precisely to the adjustment value of the sensor, exceeds a predefined threshold value, that a variance of the gray values of the picture points of the given image region falls short of a defined threshold value, and/or that a ratio which is formed by dividing a variance of the gray values of the picture points of the given image region by a variance of the gray values of all picture points of the given individual image, falls short of a defined threshold value.

Further features which may be examined by the device are whether the given image region is re-recognised in individual images which in the sequence are subsequent to the given individual image and/or whether in the individual images subsequent to the individual image, an average value of the gray values of the picture points of the given image region changes by more than a defined threshold value.

A further feature that may be examined is whether in the following individual images, the gray values of the picture points of the image region to be examined lie in a defined vicinity of the adjustment value of the sensor in a manner recurring with a periodicity, wherein the periodicity must lie above a threshold value.

Thereby, the periodicity may be determined via the computation of the Hamming distance between a first vector and a second vector, wherein in an nth entry of the first vector, it is specified as to whether the gray values of the given image region in an individual image which precedes the given individual image in the sequence of the individual images at the nth location (thus in the sequence, precisely n−1 further individual images are located between this individual image and the given individual image), lie within the defined vicinity of the adjustment value of the sensor or outside the defined vicinity of the adjustment value of the sensor. The second vector is formed from the first vector by way of a bitwise shifting of the first vector by p bits.

Thereby, the computation of the Hamming distance may be carried out in a repeated manner for different values of p, wherein finally that value of p, at which the Hamming distance is minimal, is determined as the period of the image region. Finally, the periodicity of the image region is computed from the Hamming distance belonging to this period, wherein generally a smaller Hamming distance means a greater periodicity.

The invention claimed is:

1. A method for recognising a pulsing light source (7), in which a sequence of individual images is acquired with a camera (2), and gray values of picture points of the individual images are measured with a light sensitive sensor (5) of the camera (2), wherein the sensor (5) comprises an array of photodetectors, wherein further, in an evaluation unit (6), all or at least some of the picture points of each individual image, on account of their gray values, are examined with regard to at least one predefined feature, wherein a given image point is classified as a light source or as a part of a light source depending on whether it displays the at least one feature, wherein for each of the picture points of each of the individual images the gray value of the picture point depends on two or more charge levels ($c_i$, i=1, 2, . . . ) of at least one of the photodetectors corresponding to the picture point at the ends of at least two integration intervals (i=1, 2 . . . ) for the picture point, wherein the at least two integration intervals for said picture point have different lengths, wherein the charge level of any of the photodetectors at the end of any of the integration intervals is indicative of the amount of illumination incident on the photodetector during the integration interval, a zero value ($c_i^0$) of the charge level at the end of any of the integration intervals indicating no illumination during the integration interval and a saturation value ($c_i^{sat}$) of the charge level at the end of any of the integration intervals indicating saturation of the photodetector during the integration interval, characterised in that the examination with regard to the at least one predefined features comprises an examination of the picture points as to whether the picture points have gray values in a defined vicinity of one of at least one predefined gray value, the at least one predefined gray value being defined as the gray value that any of the picture points attains if the charge levels of the at least one photodetector corresponding to the picture point at the ends of the at least two integration intervals (i=1, 2 . . . ) for the picture point have either the corresponding zero value or the corresponding saturation value.

2. A method according to claim 1, characterised in that a sensitivity of the photodetectors is such that if any one of the photodetectors is illuminated with one of the light pulses during one of the integration intervals, the photodetector saturates during the illumination with the light pulse and the charge level of the photodetector at the end of the integration interval has the corresponding saturation value.

3. A method according to claim 1, characterised in that a sensitivity of the photodetectors is such that the charge level of each photodetector of the sensor located in an area of the sensor associated with the pulsing light source does not change during any of said integration intervals of the photodetector if said photodetector is not illuminated by any of the light pulses during the integration interval and the charge level of the photodetector at the end of the integration interval has the corresponding zero value.

4. A method according to claim 1, characterised in that an image rate of the sensor is less than a pulse rate of the light pulses and/or that the lengths of said at least two integration intervals for any of the image points is greater than a pulse duration of the light pulses.

5. A method according to claim 1, characterised in that for each picture point of each of the individual images the charge levels are read out from the one or more photodetectors corresponding to the picture point at the ends of each of the integration intervals for said picture point.

6. A method according to claim 1, characterised in that for each picture point of each of the individual images the at least two integration intervals for the picture point follow each other, wherein the charge level of the at least one photodetector corresponding to the picture point is reset to one of at least one predefined adjustment value of the sensor at the end of one of the integration intervals for said picture point if the charge level of the at least one photodetector has passed the adjustment value at the end of said integration interval such that said adjustment value is the charge level of said photodetector at the beginning of the following integration interval for said picture point of said individual image, wherein the charge level of the at least one photodetector corresponding to the picture point is read out from the at least one photodetector corresponding to the picture point at the end of the last integration interval for said picture point of said individual image.

7. A method according to claim 6, characterised in that the at least one predefined gray value is defined as the at least one predefined adjustment value of the sensor or that the at least one predefined gray value includes the at least one predefined adjustment value of the sensor.

8. A method according to claim 1, characterised in that for each of the picture points of each of the individual images the gray value of the picture point corresponds to the charge level of the at least one photodetector corresponding to the picture point at the end of the longest of the at least two integration intervals for that picture point at the end of which the at least one photodetector is not saturated.

9. A method according to claim 1, wherein the picture points are, by way of their gray values, combined into image regions.

10. A method according to claim 9, characterised in that the given image region is classified as a pulsing light source or as part of a pulsing light source depending on whether a relative share of picture points of the given image region, whose gray values correspond exactly to one of the at least one predefined gray value, exceeds a predefined threshold value.

11. A method according to claim 9, characterised in that the given image region is classified as a pulsing light source or as part of a pulsing light source depending on whether a variance of the gray values of the picture points of the given image region falls short of a threshold value.

12. A method according to claim 9, characterised in that the given image region is classified as a pulsing light source or as part of a pulsing light source depending on whether a ratio which is formed by dividing a variance of the gray values of the picture points of the given image region by a variance of the gray values of all picture points of the given image region, falls short of a threshold value.

13. A method according to claim 12, characterised in that the given image region is classified as a pulsing light source or as part of a pulsing light sources, depending on whether in the individual images which are subsequent to the individual image, an average value of the gray values of the picture points of the given image region changes by more than a predefined threshold value.

14. A method according to claim 13, characterised in that the periodicity is determined by way of the Hamming distance between a first vector and a second vector, wherein in an nth entry of the first vector, it is specified whether the gray values of the given image region in an individual image preceding the given individual image in the sequence of individual images at the nth location, lie within the defined vicinity of one of the at least one predefined gray value or outside the defined vicinity of one of the at least one predefined gray value, and the second vector is formed from the first vector by way of a bitwise shifting of the first vector by p bits, wherein the computation of the Hamming distance is repeated for different values of p, and that value of p, at which the Hamming distance is minimal, is determined as a period of the image region, and the periodicity of the image region is computed from the Hamming distance belonging to this period.

15. A method according to claim 12, characterised in that the given picture point or image region is classified as a pulsing light source or as part of a pulsing light source, depending on whether in the subsequent individual images, the gray values of the picture point or picture points of the given image region, lie in the defined vicinity of one of the at least one predefined gray value in a manner recurring with a periodicity, wherein the periodicity lies above a threshold value.

16. A method according to claim 1, characterised in that the given picture point or image region is classified as a pulsing light source or as part of a pulsing light source, depending on whether in individual images which in the sequence are subsequent to the given individual image, the given picture point or image region is re-recognised.

17. A device for recognising a pulsing light source (7), comprising a camera (2) for acquiring a sequence of individual images, wherein the camera (2) comprises a light-sensitive sensor (5) with an array of photodetectors for measuring gray values of picture points of the individual images, and an evaluation unit (6) which is configured to examine all or at least some of the picture points of each individual image, on account of their gray values, are examined with regard to at least one predefined feature, wherein a given image point is classified as a light source or as a part of a light source depending on whether it displays the at least one feature, wherein for each of the picture points of each of the individual images the gray value of the picture point depends on two or more charge levels ($c_i$, i=1, 2, . . . ) of at least one of the photodetectors corresponding to the picture point at the ends of at least two integration intervals (i=1, 2 . . . ) for the picture point, wherein the at least two integration intervals for said picture point have different lengths, wherein the charge level of any of the photodetectors at the end of any of the integration intervals is indicative of the amount of illumination incident on the photodetector during the integration interval, a zero value ($c_i^0$) of the charge level at the at the end of any of the integration intervals indicating no illumination during the integration interval and a saturation value ($c_i^{sat}$) of the charge level at the end of any of the integration intervals indicating saturation of the photodetector during the integration interval, characterised in that at least one predefined gray value is defined as the gray value that any of the picture points attains if the charge levels of the at least one photodetector corresponding to this picture point at the ends of the at least two integration intervals (i=1, 2 . . . ) for the picture point have either the corresponding zero value or the corresponding saturation value, wherein the examination with regard to the at least one predefined feature comprises an examination of the image regions as to whether the picture points of these image regions comprise gray values in a defined vicinity of one of the at least one predefined gray value of the sensor.

18. A device according to claim 17, characterised in that a sensitivity of the photodetectors is such that if any one of the photodetectors is illuminated with one of the light pulses during one of the integration intervals, the photodetector saturates during the illumination with the light pulse and the charge level of the photodetector at the end of the integration interval has the corresponding saturation value ($c_i = c_i^{sat}$).

19. A device according to claim 17, characterised in that a sensitivity of the photodetectors is such that the charge level of each photodetector of the sensor located in an area of the sensor associated with the pulsing light source does not change during any of said integration intervals of the photodetector if said photodetector is not illuminated by any of the light pulses during the integration interval and the charge level of the photodetector at the end of the integration interval has the corresponding zero value ($c_i = c_i^0$).

20. A device according to claim 17, characterised in that an image rate of the sensor is less than a pulse rate of the light pulses and/or that the duration of said at least two integration intervals for any of the image points is greater than a pulse duration of the light pulses.

21. A device according to claim 17, characterised in that the sensor comprises a read-out circuitry configured to read out from any of the photodetectors the charge levels at the ends of any of the integration intervals.

22. A device according to claim 17, characterised in that the sensor is configured such that for each picture point of each of the individual images the at least two integration intervals for the picture point follow each other, wherein the sensor is configured to reset the charge level of the at least one photodetector corresponding to the picture point to one of at least one predefined adjustment value of the sensor at the end of one of the integration intervals for said picture point if the charge level of the at least one photodetector has passed the adjustment value at the end of said integration interval such that said adjustment value is the charge level of said photodetector at the beginning of the following integration interval for said picture point of said individual image, wherein the sensor further comprises a read-out circuitry configured to read the charge level of the at least one photodetector corresponding to said picture point out from said at least one photodetector at the end of the last integration interval for said picture point.

23. A device according to claim 22, characterised in that the at least one predefined gray value is defined as the at least one predefined adjustment value of the sensor or that the at least one predefined gray value includes the at least one predefined adjustment value of the sensor.

24. A device according to claim 17, characterised in that for each of the picture points of each of the individual images the gray value of the picture point corresponds to the charge level of the at least one photodetector corresponding to said picture point at the end of the longest of the at least two integration intervals for that picture point at the end of which the at least one photodetector is not saturated.

25. A vehicle (10) with a driver assistance system which comprises a device according to claim 17 and which is configured to recognise headlights (7) and/or rear lights (7) of other vehicles (4), in particular pulsing light sources, such as LED headlights and/or LED rear lights, wherein the camera (2) of the device is preferably aligned in the direction of a front side (3) of the vehicle (1).

* * * * *